(12) United States Patent
Guo et al.

(10) Patent No.: US 10,908,759 B2
(45) Date of Patent: Feb. 2, 2021

(54) TOUCH SUBSTRATE, DETECTION METHOD AND DISPLAY DEVICE

(71) Applicant: BOE TECHNOLOGY GROUP CO., LTD., Beijing (CN)

(72) Inventors: Yuzhen Guo, Beijing (CN); Yingming Liu, Beijing (CN); Haisheng Wang, Beijing (CN); Xiaoliang Ding, Beijing (CN); Xueyou Cao, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/527,643

(22) Filed: Jul. 31, 2019

(65) Prior Publication Data

US 2020/0218384 A1    Jul. 9, 2020

(30) Foreign Application Priority Data

Jan. 3, 2019  (CN) .......................... 2019 1 0005569

(51) Int. Cl.
*G06F 3/047*  (2006.01)
*G06F 3/044*  (2006.01)
*G06F 3/041*  (2006.01)

(52) U.S. Cl.
CPC ............ *G06F 3/047* (2013.01); *G06F 3/0412* (2013.01); *G06F 3/0414* (2013.01); *G06F 3/0448* (2019.05); *G06F 2203/04105* (2013.01)

(58) Field of Classification Search
CPC ........ G06F 3/044–3/0448; G06F 2203/04105; G06F 2203/04111; G06F 2203/04112
See application file for complete search history.

(56) References Cited

U.S. PATENT DOCUMENTS

| | | | |
|---|---|---|---|
| 10,254,894 B2* | 4/2019 | Nathan | G06F 3/0416 |
| 10,310,659 B2* | 6/2019 | Nathan | G06F 3/0445 |
| 10,318,038 B2* | 6/2019 | Nathan | G06F 3/0446 |
| 2009/0309616 A1* | 12/2009 | Klinghult | G06F 3/0416 |
| | | | 324/686 |
| 2017/0115770 A1* | 4/2017 | Han | G06F 3/044 |
| 2017/0262099 A1* | 9/2017 | Nathan | G06F 3/0414 |
| 2018/0088708 A1* | 3/2018 | Naganuma | G06F 3/0412 |
| 2019/0050080 A1* | 2/2019 | Bagheri | G06F 3/044 |

* cited by examiner

*Primary Examiner* — Gene W Lee
(74) *Attorney, Agent, or Firm* — Arch & Lake LLP

(57) ABSTRACT

A touch substrate includes a common electrode, a piezoelectric material layer and a touch electrode sequentially disposed on the substrate. The touch electrode includes a plurality of touch driving electrodes and a plurality of touch sensing electrodes, which cross with each other and are insulated from one another. The touch driving electrode includes a plurality of first touch sub-electrodes that are electrically connected. An overlapping area of front projections of the common electrode and each of the first touch control sub-electrodes on the substrate is smaller than an area of a pattern enclosed by a peripheral boundary of the first touch sub-electrodes.

18 Claims, 12 Drawing Sheets

TOUCH SUBSTRATE, DETECTION METHOD AND DISPLAY DEVICE

CROSS-REFERENCED TO RELATED APPLICATION

The present application is based on and claims priority to Chinese Patent Application No. 201910005569.X, filed on Jan. 3, 2019, the entire contents of which is incorporated herein by reference.

TECHNICAL FIELD

This disclosure relates to a displaying technical field, in particular to a touch substrate, a detection method thereof and a display device.

BACKGROUND

With development of information technology, a mobile terminal is carried with more and more plentiful functions, and various applications of new technologies and new functions are also presented in different ways. A pressure touch (3D-Touch) technology may improve user experience due to realization of different functions based on different pressing strengths.

At present, a pressure touch sensor based on piezoelectric effect is generally used to realize the touch and pressure sensing functions. However, a self-capacitance between a drive electrode (TX) and a common electrode is so large, which can cause a drive circuit to hardly drive the TX in the touch process.

SUMMARY

According to one aspect of this disclosure, a touch substrate includes a common electrode, a piezoelectric material layer and a touch electrode sequentially disposed on the substrate. The touch electrode includes a plurality of touch driving electrodes and a plurality of touch sensing electrodes. The touch driving electrodes and the touch sensing electrodes cross with each other and are insulated from one another. The touch driving electrode include a plurality of first touch sub-electrodes electrically connected. An overlapping area of front projections of the common electrode and each of the first touch sub-electrodes on the substrate is smaller than an area of a pattern enclosed by a peripheral boundary of the first touch sub-electrodes.

Optionally, the common electrode is presented in a grid shape. The overlapping area of the front projections of the common electrode and each of the first touch sub-electrodes on the substrate is 0.

Further optionally, each of the first touch sub-electrodes is presented in a grid shape.

Optionally, the front projection of the common electrode on the substrate completely covers the front projection of the touch sensing electrode on the substrate.

Optionally, the touch substrate further includes a plurality of auxiliary electrodes arranged on the same layer with the common electrode and insulated from one another, and the adjacent auxiliary electrodes are electrically connected through a first bridge. The auxiliary electrodes correspond to the first touch sub-electrodes one by one, and the front projections of the auxiliary electrodes on the substrate completely cover the front projections of the corresponding first touch sub-electrodes on the substrate.

Optionally, each of the first touch sub-electrodes is presented in a grid shape, and the common electrode is a plate tiled on the substrate.

Optionally, the touch sensing electrode includes a plurality of second touch sub-electrodes electrically connected; the adjacent second touch sub-electrodes in the touch sensing electrodes are directly electrically connected, and the adjacent first touch sub-electrodes in the touch driving electrodes are electrically connected by a second bridge. Or, the adjacent first touch sub-electrodes in the touch driving electrode are directly electrically connected, and the adjacent second touch sub-electrodes in the touch sensing electrode are electrically connected by a third bridge.

According to the second aspect, it is provided with a touch substrate. The touch substrate includes a common electrode, a piezoelectric material layer and a touch electrode sequentially disposed on the substrate. The touch electrode includes a plurality of third touch sub-electrodes. An overlapping area of front projections of the common electrode and each of the third touch sub-electrodes on the substrate is smaller than an area of a pattern enclosed by a peripheral boundary of the third touch sub-electrodes.

Optionally, an overlapping area of the front projections of the common electrode and each of the third touch sub-electrodes on the substrate is 0. The common electrode is presented in a grid shape. Or, each of the third touch sub-electrodes is presented in a grid shape.

Optionally, in the event that the common electrode is presented in a grid shape, the touch substrate further includes a plurality of auxiliary electrodes that are disposed on the same layer with the common electrode and are insulated from one another, and the adjacent auxiliary electrodes are electrically connected through a first bridge. The auxiliary electrodes correspond to the third touch sub-electrodes one by one, and the front projection of each of the auxiliary electrodes on the substrate cover the front projections of the corresponding third touch sub-electrodes on the substrate.

According to the third aspect, it is provided with a touch substrate. The touch substrate includes a common electrode, a piezoelectric material layer and a plurality of touch sensing electrodes disposed on the substrate. The touch substrate further includes a plurality of touch driving electrodes that are disposed on one side of the piezoelectric material layer facing away from the touch sensing electrodes. The touch driving electrodes and the common electrode are insulated from each other. The projections of the touch sensing electrodes and the common electrode on the substrate have an overlapping area. The touch driving electrode includes a plurality of first touch sub-electrodes electrically connected. The touch sensing electrode includes a plurality of second touch sub-electrodes electrically connected, and the front projections of the first touch sub-electrodes on the substrate do not overlap with the front projections of the second touch sub-electrodes and the common electrode on the substrate.

Optionally, the touch driving electrode and the common electrode are disposed on the same layer.

Optionally, the common electrode is presented in a grid shape.

Optionally, the front projection of the common electrode on the substrate completely covers the front projection of the touch sensing electrode on the substrate.

Optionally, the touch substrate further includes a plurality of auxiliary electrodes that are disposed on the same layer with the touch sensing electrodes and are insulated from one another, and the adjacent auxiliary electrodes are electrically connected through a first bridge. The auxiliary electrodes correspond to the first touch sub-electrodes one by one, and the front projection of each of the auxiliary electrodes on the substrate completely covers the front projection of the corresponding first touch sub-electrode on the substrate.

According to the fourth aspect, it is provided with a display device. The display device includes a display panel, and the touch substrate according to the first aspect and the second aspect. The touch substrate is arranged on a light-emitting side of the display panel.

Optionally, the display panel is an electroluminescent display panel, and includes an anode layer, a light-emitting functional layer, and a cathode layer sequentially disposed on one side the of the substrate, the cathode layer is also used as the common electrode.

According to the fifth aspect, it is provided with a detection method of the touch substrate according to the one aspect and the second aspect. The method includes: at a touch detection stage, detecting a touch position by using a touch electrode; and at a pressure detection stage, inputting a fixed potential to a common electrode. Under an action of pressure, the method includes detecting magnitude of the pressure by detecting amount of charges received by the touch electrode.

Optionally, in the event that the touch substrate includes a plurality of auxiliary electrodes, the method further includes at a testing phase, the potential of the auxiliary electrode is the same as the potential of the common electrode. At the touch detection stage and at the pressure detection stage, the potential of the auxiliary electrode is a floating potential.

BRIEF DESCRIPTION OF THE DRAWINGS

In order to more clearly illustrate arrangements of the present disclosure or the technical solutions in the related art, hereinafter, drawings need to be used in the arrangements or description of the related art will be briefly introduced. Obviously, the drawings as described below are only exemplary, based on which the other drawings may be obtained by the person skilled in the art without any creative work.

Figure 1:
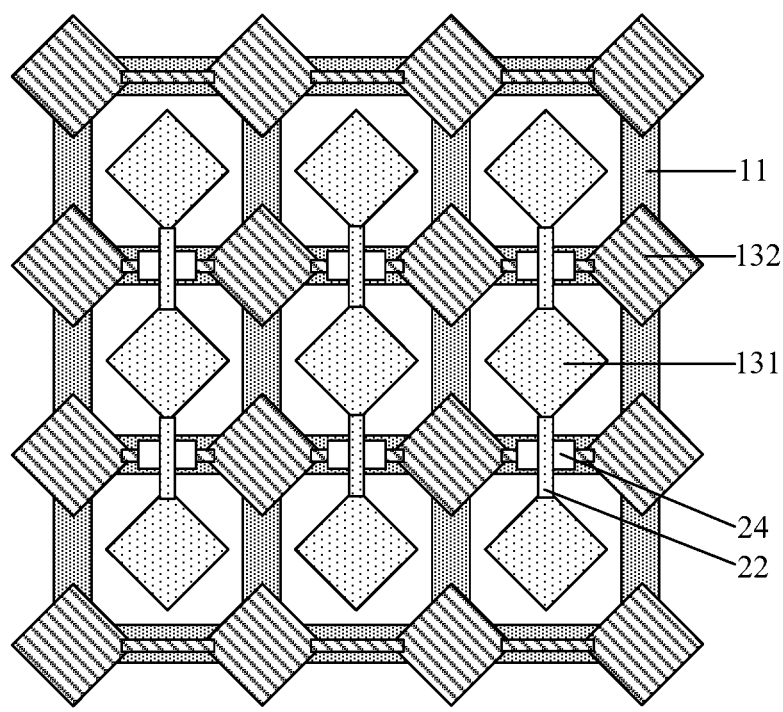
FIG. 1 is a schematic top view of a touch substrate provided by an arrangement of the present disclosure.

Reference numbers are listed as follows:

DETAILED DESCRIPTION

Hereinafter, the technical solutions in the arrangements of the present disclosure will be clearly and completely described with reference to the accompanying drawings. Obviously, the described arrangements are merely a part of the arrangements, but not all of the arrangements of the present disclosure. All other arrangements obtained by the person skilled in the art based on the arrangements of the present disclosure without creative effort are within the scope of the present disclosure.

An arrangement of the present disclosure provides a touch substrate, as shown in FIGS. 1-8, including a common electrode 11, a piezoelectric material layer 12 and a touch electrode 13, which are sequentially disposed on a substrate 10. The touch electrode 13 includes a plurality of touch driving electrodes and a plurality of touch sensing electrodes, which cross with each other and insulated from each other. The touch driving electrode includes a plurality of first touch sub-electrodes 131 electrically connected to one another. An overlapping area of front projections of the common electrode 11 and each of the first touch sub-electrodes 131 on the substrate 10 is smaller than an area of a pattern enclosed by a peripheral boundary of the first touch sub-electrodes 131.

When a user presses the touch substrate, at a stage to detect the pressure, the piezoelectric material layer 12 generates electric charge under an action of pressure, the touch electrode 13 receives the electric charges in a charge-coupling manner, and an external circuit electrically connected with the touch electrode 13 detects magnitude of the pressure depending on amount of the electric charges received by the touch electrode 13. At a touching stage, the touch sensing electrode and the touch driving electrode are used to detect a touch position.

Based on this, the touch sensing electrode includes a plurality of second touch sub-electrodes 132 electrically connected to one another.

It should be noted that, firstly, connection modes of the plurality of first touch sub-electrodes 131 in the touch driving electrode are not defined, and connection modes of the plurality of second touch sub-electrodes 132 in the touch sensing electrode are not defined.

For example, as shown in FIG. 1, the adjacent first touch sub-electrodes 131 in the touch driving electrode are electrically connected by a second bridge 22, and the adjacent second touch sub-electrodes 132 in the touch sensing electrode are electrically connected directly. The second bridge 22 is separated from the second touch sub-electrode 132 by an insulating block 24. The adjacent second touch sub-electrodes 132 may be directly electrically connected through a touch electrode lead.

Figure 6:
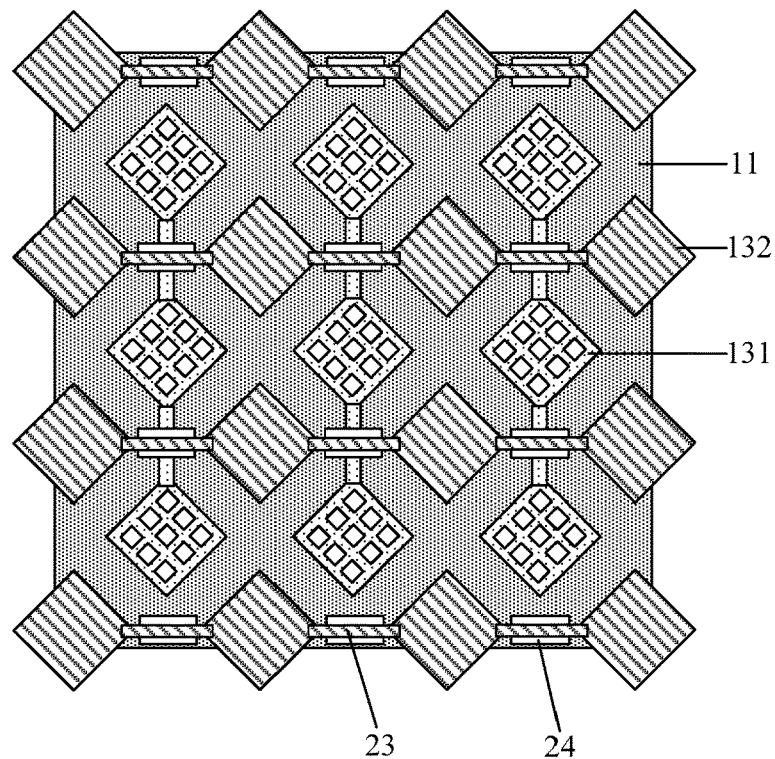
FIG. 6 is a schematic top view of a touch substrate provided by an arrangement of the present disclosure.

Alternatively, as shown in FIG. 6, the adjacent first touch sub-electrodes 131 in the touch driving electrode are directly electrically connected, and the adjacent second touch sub-electrodes 132 in the touch sensing electrode are electrically connected by a third bridge 23. The third bridge 23 is separated from the first touch sub-electrode 131 by the insulating block 24. The adjacent first touch sub-electrodes 131 may be directly electrically connected through the touch electrode lead.

Secondly, materials of the common electrode 11 are not limited, specifically, are related to application scene, setting position, and shape of the common electrode 11. For example, the material of the common electrode 11 may be a transparent conductive material, such as Indium tin oxide (ITO) or a metal.

Specifically, in the event that the touch substrate is applied to a display device, if the common electrode 11 is positioned in a non-display area, or the common electrode 11 is presented in a grid shape, and the common electrode 11 is positioned in an area between the adjacent sub-pixel areas, the material of the common electrode 11 may be a metal or a transparent conductive material; if the common electrode 11 is positioned in the sub-pixel area, the material of the common electrode 11 is a transparent conductive material.

Thirdly, materials of the touch electrode 13 is not limited, specifically, are related to the application scene and setting position of the touch electrode 13. For example, the material of the touch electrode 13 may be a transparent conductive material, such as ITO or a metal.

Specifically, in the event that the touch substrate is applied to a display device, if the touch electrode 13 is positioned in an area between the adjacent sub-pixel areas, or the touch electrode 13 is positioned in a non-display area, the material of the touch electrode 13 may be a metal but also a transparent conductive material; if the touch electrode 13 is positioned in the sub-pixel area, the material of the touch electrode 13 is a transparent conductive material.

Fourthly, shapes of the common electrode 11 and the first touch sub-electrode 131 are not limited, provided that the overlapping area of the front projection of the common electrode 11 and each of the first touch sub-electrodes 131 on the substrate 10 is smaller than the area of the pattern enclosed by the peripheral boundary of the first touch sub-electrodes 131.

As an example, the first touch sub-electrode 131 has a diamond shape.

An arrangement of the present disclosure provides a touch substrate, in which an overlapping area of the front projection of the common electrode 11 and each of the first touch sub-electrodes 131 on the substrate 10 is smaller than an area of the pattern enclosed by the peripheral boundary of the first touch sub-electrodes 131. Compared with the related art, in which the overlapping area of the front projection of the common electrode 11 and each of the first touch sub-electrodes 131 on the substrate 10 is equal to the area of the pattern enclosed by the peripheral boundary of the first touch sub-electrodes 131, the arrangement of the present disclosure can effectively reduce capacitance between the common electrode 11 and the touch driving electrode, so as to solve a problem that it is difficult for the touch driving electrode to drive the electrodes due to too large capacitance at the touch detection stage.

Optionally, as shown in FIG. 1, the common electrode 11 is presented in a grid shape. The overlapping area of the front projection of the common electrode 11 and each of the first touch sub-electrodes 131 on the substrate 10 is 0. That is, the front projection of the common electrode 11 on the substrate 10 is presented in a grid shape, and the front projection of the first touch sub-electrodes 131 on the substrate 10 are within the grid.

Here, since the plurality of first touch sub-electrodes 131 need to be electrically connected through the second bridge 22 or the touch electrode lead, and the front projection of the first touch sub-electrodes 131 on the substrate 10 is within the grid, the front projection of the second bridge 22 or the touch electrode lead on the substrate 10 and the front projection of the common electrode 11 on the substrate 10 have an overlapping area. But, this does not affect to the result that the overlapping area of the front projections of the common electrode 11 and each first touch sub-electrode 131 on the substrate 10 is 0.

It should be noted, in the event that the common electrode 11 is presented in a grid shape, the shape of the first touch sub-electrode 131 is not limited, provided that the overlapping area of the front projections of the common electrode 11 and each of the first touch sub-electrodes 131 on the substrate 10 is 0.

Figure 2:
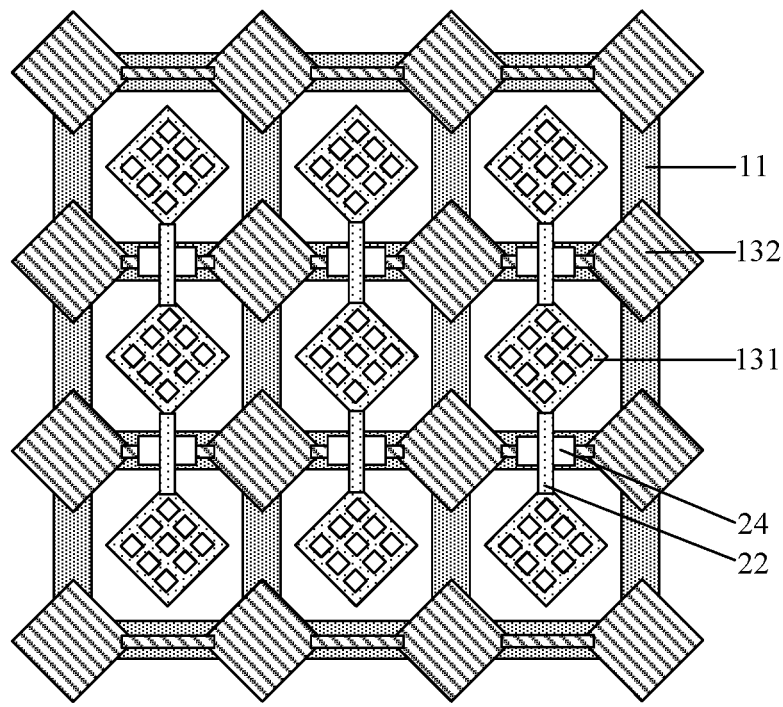
FIG. 2 is a schematic top view of a touch substrate provided by an arrangement of the present disclosure.

For example, as shown in FIG. 1, the first touch sub-electrode 131 has a diamond shape, or, as shown in FIG. 2, the first touch sub-electrode 131 has a grid shape, so that light utilization rate of the display device may be increased when the touch substrate is applied to a display device.

Figure 3:
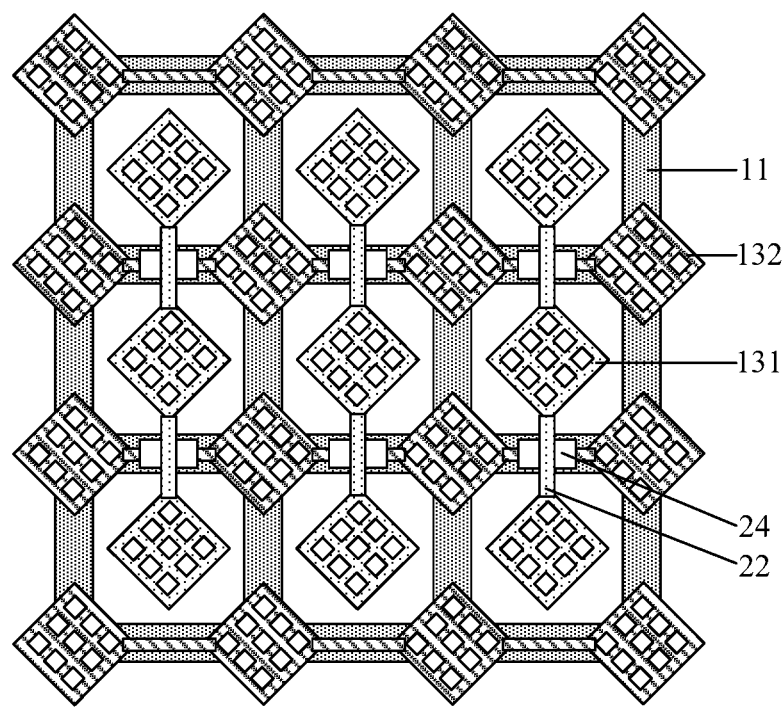
FIG. 3 is a schematic top view of a touch substrate provided by an arrangement of the present disclosure.

Based on this, as shown in FIGS. 1 and 2, the second touch sub-electrode 132 has a diamond shape, or, as shown in FIG. 3, the second touch sub-electrode 132 has a grid shape.

In the arrangement of the present disclosure, the common electrode 11 is presented in the grid shape such that the overlapping area of the front projections of the touch driving electrode and the common electrode 11 on the substrate 10 is reduced, and the capacitance between the touch driving electrode and the common electrode 11 can be reduced.

Optionally, the front projection of the common electrode 11 on the substrate 10 completely covers the front projection of the touch sensing electrode on the substrate 10.

In the arrangement of the present disclosure, as compared with the related art, the overlapping area of the front projections of the common electrode 11 and the touch driving electrode on the substrate 10 in the arrangement of the present disclosure is reduced, accordingly, the front projection of the common electrode 11 on the substrate 10 and the front projection of the touch sensing electrode on the substrate 10 at least should be ensured to have an overlapping area to realize pressure detection. Thus, it is preferable that the front projection of the common electrode 11 on the substrate 10 completely covers the front projection of the touch sensing electrode on the substrate 10 to avoid affecting an effect of the pressure detection.

Figure 4:
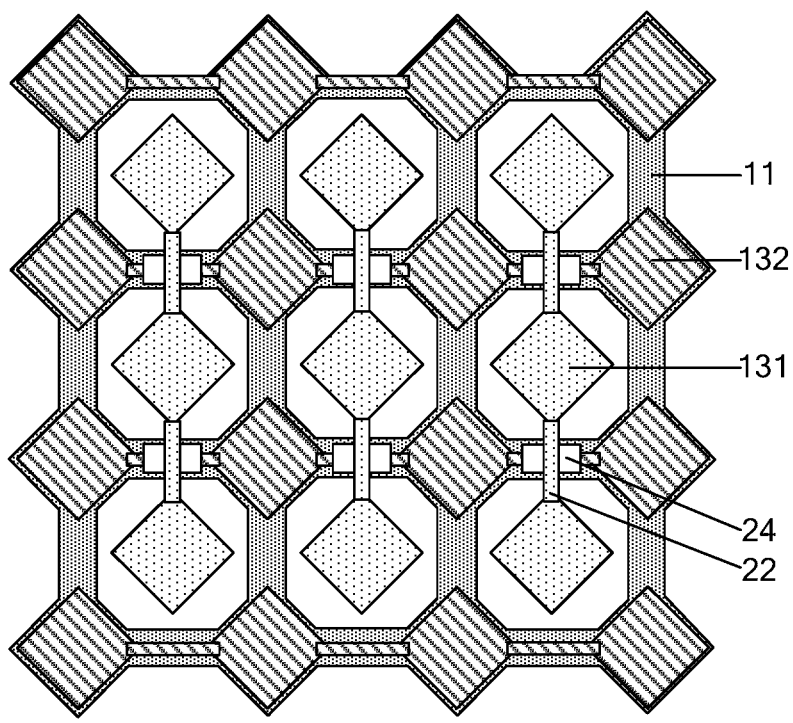
FIG. 4 is a schematic top view of a touch substrate provided by an arrangement of the present disclosure.

Optionally, as shown in FIG. 4, in the event that the common electrode has a grid shape, the front projection of the common electrode 11 on the substrate 10 completely covers the front projection of the touch sensing electrode on the substrate 10.

In the arrangement of the present disclosure, at the stage to detect the pressure, the front projection of the common electrode 11 on the substrate 10 completely covers the front projection of the touch sensing electrode on the substrate 10 to avoid that the overlapping area of the front projection of the touch driving electrode and the common electrode 11 on the substrate 10 is reduced when the common electrode 11 is in a grid shape to affect the effect of the pressure detection.

Figure 5:
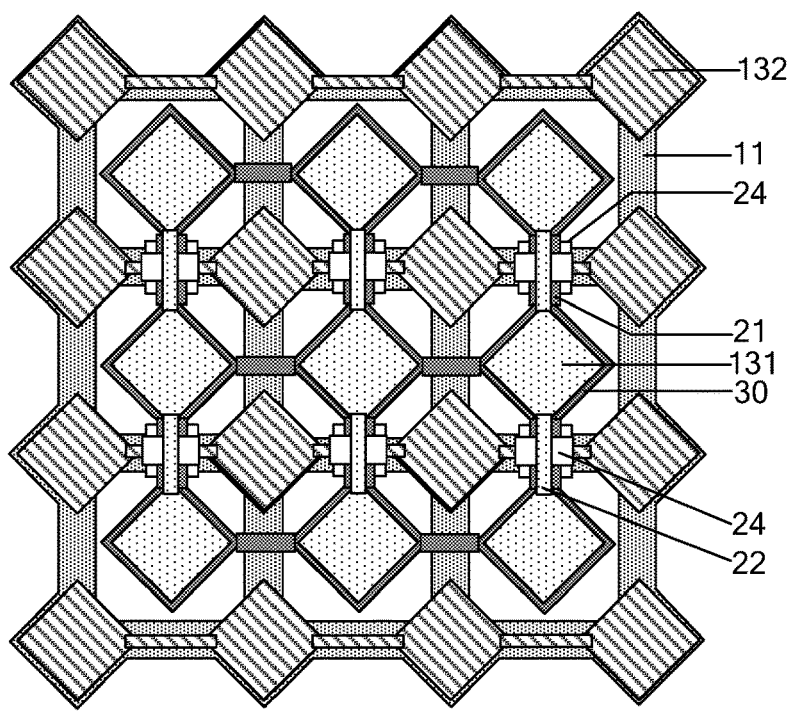
FIG. 5 is a schematic top view of a touch substrate provided by an arrangement of the present disclosure.

Optionally, as shown in FIG. 5, the touch substrate further includes a plurality of auxiliary electrodes 30 that are disposed on the same layer with the common electrode 11 and are insulated from each other. The adjacent auxiliary electrodes 30 are electrically connected through the first bridge 21. The auxiliary electrodes 30 correspond to the first touch sub-electrodes 131 one by one, and the front projection of each auxiliary electrode 30 on the substrate 10 completely covers the front projection of the corresponding first touch sub-electrode 131 on the substrate 10.

It should be noted that: firstly, as shown in FIG. 5, a plurality of first bridges 21 may be spaced apart from the common electrode 11 by insulating blocks 24.

Secondly, the front projection of the auxiliary electrode 30 on the substrate 10 may just cover the front projection of the corresponding first touch sub-electrode 131 on the substrate 10, and an area of the front projection of the auxiliary electrode 30 on the substrate 10 is equal to an area of the front projection of the corresponding first touch sub-electrode 131 on the substrate 10. The front projection of the auxiliary electrode 30 on the substrate 10 may completely cover the front projection of the corresponding first touch sub-electrode 131 on the substrate 10, and the area of the front projection of the auxiliary electrode 30 on the substrate 10 may be larger than the area of the front projection of the corresponding first touch sub-electrode 131 on the substrate 10.

In the arrangement of the present disclosure, at a testing stage, the piezoelectric material layer 12 is polarized by corresponding the touch driving electrode to the auxiliary electrode 30 up and down and corresponding the touch sensing electrode to the common electrode 11 up and down, so that molecules in the piezoelectric material layer 12 realize regular ionization arrangement, and the piezoelectric material layer 12 after being polarized has a pressure sensing function. At the pressure detection stage, even if a potential of the auxiliary electrode 30 is a floating potential, a portion of the piezoelectric material layer 12 corresponding to the touch driving electrode may have a piezoelectric function.

Figure 7:
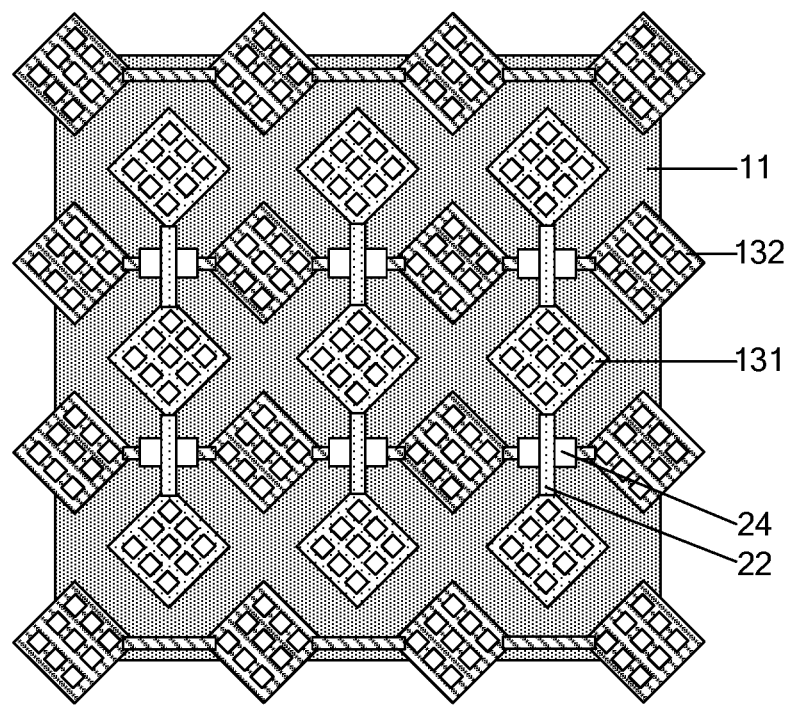
FIG. 7 is a schematic top view of a touch substrate provided by an arrangement of the present disclosure.
Figure 8:
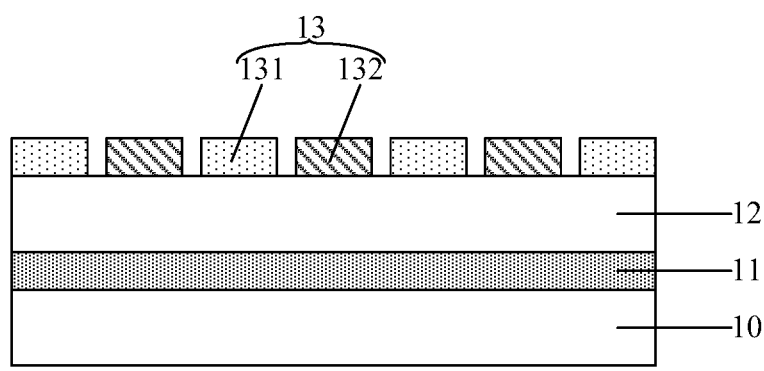
FIG. 8 is a schematic structural view of a touch substrate provided by an arrangement of the present disclosure.

Optionally, as shown in FIGS. 6 and 7, each of the first touch sub-electrodes 131 has a grid shape, and the common electrode 11 is plate-shaped, tiled on the substrate 10.

Here, as shown in FIG. 6, the second touch sub-electrode 132 may have a diamond shape. As shown in FIG. 7, the second touch sub-electrode 132 may also have a grid shape.

In the arrangement of the present disclosure, each of the first touch sub-electrodes 131 has a grid shape, such that the overlapping area of the front projections of the touch driving electrode and the common electrode 11 on the substrate 10 is reduced, and thus the capacitance between the touch driving electrode and the common electrode 11 is reduced.

Figure 9:
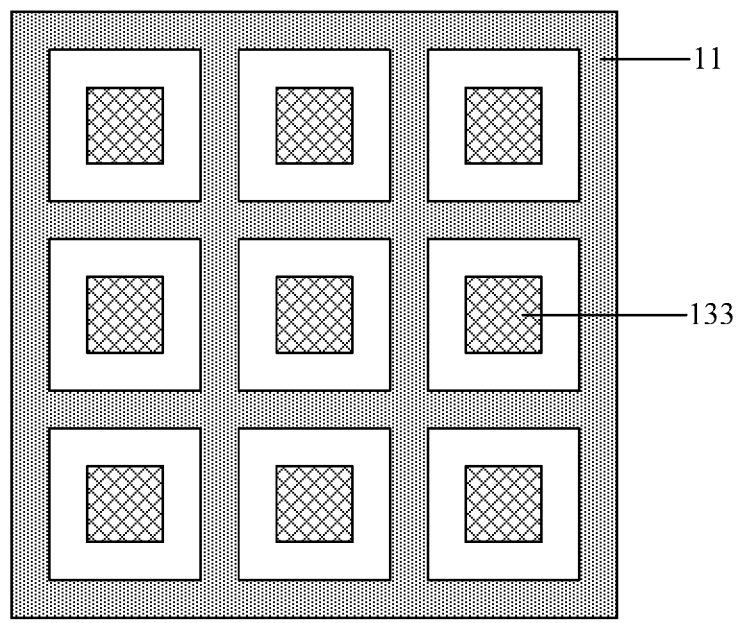
FIG. 9 is a schematic top view of a touch substrate provided by an arrangement of the present disclosure.
Figure 10:
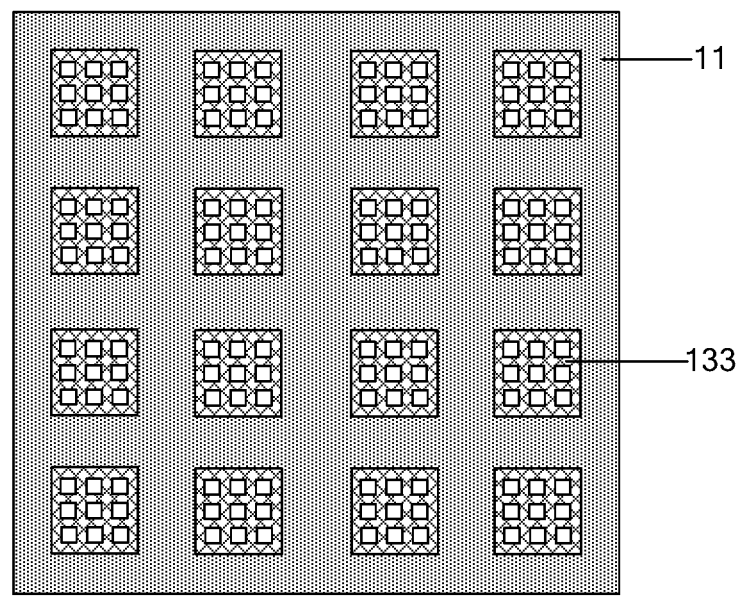
FIG. 10 is a schematic top view of a touch substrate provided by an arrangement of the present disclosure.

The arrangement of the present disclosure provides a touch substrate, as shown in FIGS. 9 and 10, including a common electrode 11, a piezoelectric material layer 12 and a touch electrode 13, which are sequentially disposed on the substrate 10. The touch electrode 13 includes a plurality of third touch sub-electrodes 133. An overlapping area of front projections of the common electrode 11 and each of the third touch sub-electrodes 133 on the substrate 10 is smaller than an area of a pattern enclosed by a peripheral boundary of the third touch sub-electrodes 133.

It should be noted that, firstly, materials of the common electrode 11 are not limited, specifically, are related to application scene, setting position, and shape of the common electrode 11. For example, the material of the common electrode 11 may be a transparent conductive material, such as ITO or a metal. Specifically, in the event that the touch substrate is applied to a display device, if the common electrode 11 is positioned in a non-display area, or the common electrode 11 is presented in a grid shape, and the common electrode 11 is positioned in an area between adjacent sub-pixel areas, the material of the common electrode 11 may be the metal or the transparent conductive material; if the common electrode 11 is positioned in the sub-pixel area, the material of the common electrode 11 is a transparent conductive material.

Secondly, materials of the touch electrode 13 are not limited, specifically, are related to application scene and setting position of the touch electrode 13. For example, the material of the touch electrode 13 may be a transparent conductive material such as ITO or a metal. Specifically, in the event that the touch substrate is applied to a display device, if the touch electrode is positioned in an area between adjacent sub-pixel areas, or the touch electrode 13 is positioned in a non-display area, the material of the touch electrode 13 may be a metal or a transparent conductive material; if the touch electrode 13 is positioned in the sub-pixel area, the material of the touch electrode 13 is a transparent conductive material.

Thirdly, shapes of the common electrode 11 and the third touch sub-electrode 133 are not limited, provided that the overlapping area of the front projections of the common electrode 11 and each of the third touch sub-electrodes 133 on the substrate 10 is smaller than the area of the pattern enclosed by the peripheral boundary of the third touch sub-electrodes 133.

As an example, the first touch sub-electrode 131 has a diamond shape.

An arrangement of the present disclosure provides a touch substrate, in which the overlapping area of the front projections of the common electrode 11 and each of the third touch sub-electrodes 133 on the substrate 10 is smaller than the area of the pattern enclosed by the peripheral boundary of the third touch sub-electrodes 133. As compared with the related art, in which the overlapping area of the front projections of the common electrode 11 and each of the third touch sub-electrodes 133 on the substrate 10 is equal to the area of the pattern enclosed by the peripheral boundary of the third touch sub-electrodes 133, the arrangement of the present disclosure can effectively reduce the capacitance between the common electrode 11 and the touch electrode 13, so as to solve the problem that it is difficult to drive the touch electrode due to the too large capacitance at the touch detection stage.

Optionally, as shown in FIG. 9, the overlapping area of the front projections of the common electrode 11 and each of the third touch sub-electrodes on the substrate 10 is 0. The common electrode 11 has a grid shape, or, as shown in FIG. 10, each of the third touch sub-electrodes 133 has a grid shape.

It should be noted that, firstly, in the event that the common electrode 11 is presented in a grid shape, the shapes of the third touch sub-electrode 133 are not limited, provided that the overlapping area of the front projections of the common electrode 11 and each of the third touch sub-electrodes 133 on the substrate 10 is 0. For example, the third touch sub-electrode 133 has a diamond shape, or the third touch sub-electrode 133 has a grid shape.

Secondly, in the event that each of the third touch sub-electrodes 133 has a grid shape, shapes of the common electrode 11 are not limited, provided that the overlapping area of the front projections of the common electrode 11 and each of the third touch sub-electrodes 133 on the substrate 10 is 0. For example, the shape of the common electrode 11 is plate-shaped, or the common electrode 11 is presented in a grid shape.

In the arrangement of the present disclosure, the common electrode 11 or each of the third touch sub-electrodes 133 is presented in a grid shape, such that the overlapping area of the front projections of the common electrode 11 and each of the third touch sub-electrodes on the substrate 10 is 0, and thus the capacitance between the touch driving electrode and the common electrode 11 is reduced.

Further optionally, in the event that the common electrode 11 is presented in a grid shape, the touch substrate further includes a plurality of auxiliary electrodes 30 that are arranged on the same layer with the common electrode 11 and insulated from one another. The adjacent auxiliary electrodes 30 are electrically connected through the first bridge 21. The auxiliary electrodes 30 correspond to the third touch sub-electrodes 131 one by one, and the front projection of each of the auxiliary electrodes 30 on the substrate 10 covers the front projection of the corresponding third touch sub-electrode 133 on the substrate 10.

It should be noted that, firstly, a plurality of first bridges 21 may be spaced apart from the common electrode 11 by insulating blocks 24.

Secondly, the front projection of the auxiliary electrode 30 on the substrate 10 may just cover the front projection of the corresponding third touch sub-electrode 133 on the substrate 10, and an area of the front projection of the auxiliary electrode 30 on the substrate 10 is equal to an area of the front projection of the corresponding third touch sub-electrode 133 on the substrate 10. The front projection of the auxiliary electrode 30 on the substrate 10 may also completely cover the front projection of the corresponding third touch sub-electrode 133 on the substrate 10, and the area of the front projection of the auxiliary electrode 30 on the substrate 10 is larger than the area of front projection of the corresponding third touch sub-electrode 133 on the substrate 10.

In the arrangement of the present disclosure, at the testing stage, the piezoelectric material layer 12 is polarized by corresponding the touch driving electrode 13 to the auxiliary electrode 30 and the common electrode 11 up and down, so that molecules in the piezoelectric material layer 12 realize regular ionization arrangement, and the piezoelectric material layer 12 after being polarized has a pressure sensing function. At the pressure detection stage, even if a potential of the auxiliary electrode 30 is a floating potential, the entire piezoelectric material layer 12 may also have a piezoelectric function.

An arrangement of the present disclosure also provides a touch substrate, as shown in FIGS. 11-14, including a common electrode 11, a piezoelectric material layer 12 and a plurality of touch sensing electrodes, which are disposed on the substrate 10, and also including a plurality of touch driving electrodes arranged on one side of the piezoelectric material layer 12 facing away from the touch sensing electrodes. The touch driving electrodes and the common electrode 11 are insulated from each other. The projections of the touch sensing electrode and the common electrode 11 on the substrate 10 have an overlapping area. The touch driving electrode includes a plurality of first touch sub-electrodes 131 that are electrically connected. The touch sensing electrode includes a plurality of second touch sub-electrodes 132 that are electrically connected. The front projections of the first touch sub-electrodes 131 on the substrate 10 do not overlap with the front projections of the second touch sub-electrodes 132 and the common electrode 11 on the substrate 10.

Figure 12:
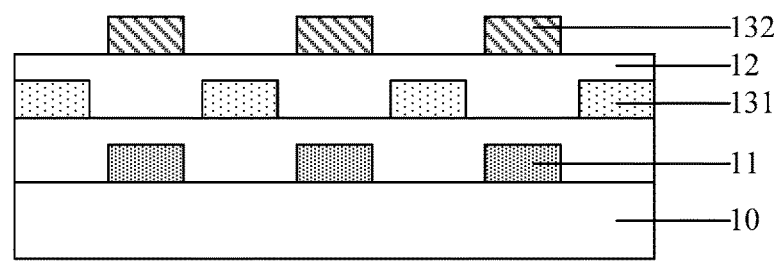
FIG. 12 is a schematic structural view of a touch substrate provided by an arrangement of the present disclosure.
Figure 13:
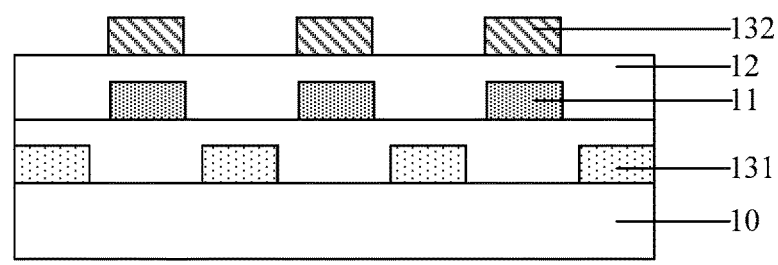
FIG. 13 is a schematic structural view of a touch substrate provided by an arrangement of the present disclosure.
Figure 14:
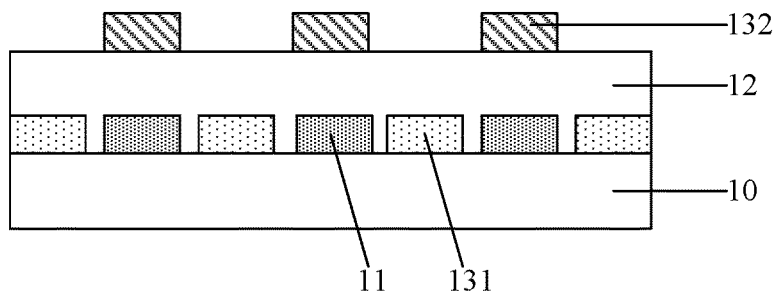
FIG. 14 is a schematic structural view of a touch substrate provided by an arrangement of the present disclosure.

It should be noted that, firstly, as shown in FIG. 12, a plurality of touch driving electrodes may be disposed between the common electrode 11 and the piezoelectric material layer 12; as shown in FIG. 13, a plurality of touch driving electrodes may also be disposed on one side of the common electrode 11 facing away from the piezoelectric material layer 12; as shown in FIG. 14, a plurality of touch driving electrodes may be disposed on the same layer with the common electrode 11.

When the common electrode 11 and the touch driving electrode are arranged on different layers, the common electrode 11 is separated from the touch driving electrode by an insulating layer.

Secondly, the connection modes of a plurality of first touch sub-electrodes 131 in each touch driving electrode are not limited; and the connection modes of a plurality of second touch sub-electrodes 132 in each touch sensing electrode are not limited.

For example, a plurality of first touch sub-electrodes 131 in each touch driving electrode may be electrically connected through a first touch electrode lead; and a plurality of second touch sub-electrodes 132 in each touch sensing electrode may be electrically connected through a second touch electrode lead.

Figure 11:
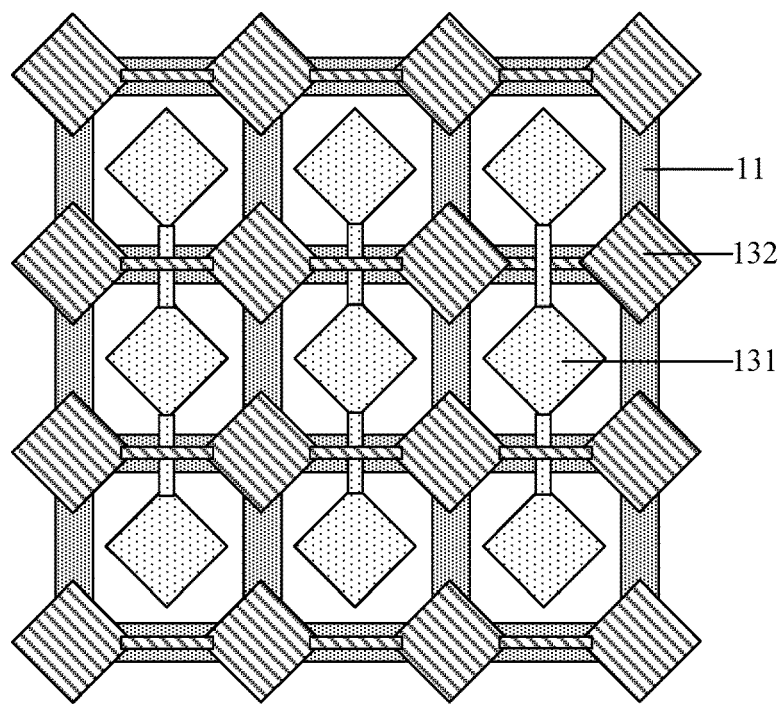
FIG. 11 is a schematic top view of a touch substrate provided by an arrangement of the present disclosure.

Here, FIG. 11 only shows the common electrode 11, the touch driving electrode, and the touch sensing electrode, wherein the first touch electrode lead for electrically connecting the plurality of first touch sub-electrodes 131 is not in direct contact (electrically connected) with the second touch electrode lead for connecting the plurality of second touch sub-electrodes 132. As above have described, the plurality of touch driving electrodes are disposed on one side of the piezoelectric material layer 12 facing away from the touch sensing electrode, that is, at least one layer of piezoelectric material layer 12 is spaced between the first touch electrode lead and the second touch electrode lead.

Thirdly, materials of the common electrode 11 are not limited, specifically, are related to the application scene, setting position, and shape of the common electrode 11. For example, the material of the common electrode 11 may be a transparent conductive material, such as ITO or a metal.

Specifically, in the event that the touch substrate is applied to a display device, if the common electrode 11 is positioned in a non-display area or the common electrode 11 is positioned in an area between adjacent sub-pixel areas, the material of the common electrode 11 may be a metal or a transparent conductive material; if the common electrode 11 is positioned in a sub-pixel area, the material of the common electrode 11 is a transparent conductive material.

Fourthly, the materials of the touch driving electrode and the touch sensing electrode are not limited, specifically, are related to the application scenes and setting positions of the touch driving electrode and the touch sensing electrode. For example, the materials of the touch driving electrode and the touch sensing electrode may be transparent conductive materials, such as ITO or metal.

Specifically, in the event that the touch substrate is applied to a display device, if the touch driving electrode and the touch sensing electrode are positioned in an area between adjacent sub-pixel areas, or if the touch driving electrode and the touch sensing electrode are positioned in a non-display area, the material of the touch electrode 13 may be a metal or a transparent conductive material; if the touch driving electrode and the touch sensing electrode are positioned in the sub-pixel area, the materials of the touch driving electrode and the touch sensing electrode are transparent conductive materials.

Fifthly, shapes of the common electrode 11, the first touch sub-electrode 131 and the second touch sub-electrode 132 are not limited, provided that the front projections of the first touch sub-electrode 131 on the substrate 10 do not overlap with the front projections of the common electrode 11 and the second touch sub-electrode 132 on the substrate 10, and the front projections of the common electrode 11 on the substrate 10 and the front projections of the touch sensing electrode on the substrate 10 have overlapping areas.

For example, the common electrode 11 has a grid shape, and the front projection of the first touch sub-electrode 131 on the substrate 10 falls into a grid of a grid-like projection of the common electrode 11 on the substrate 10.

An arrangement of the present disclosure provides a touch substrate. The front projections of the first touch sub-electrodes 131 on the substrate 10 do not overlap with the front projections of the common electrode 11 and the second touch sub-electrode 132 on the substrate 10; and the front projection of the common electrode 11 on the substrate 10 and the front projection of the touch sensing electrode on the substrate 10 have overlapping areas. As one aspect, at the pressure detection stage, the touch sensing electrode, the piezoelectric material layer 12 and the common electrode 11 may also normally carry out the pressure detection; as the other aspect, as compared with the related art, in which the overlapping area of the front projections of the common electrode 11 and each of the first touch sub-electrodes 131 on the substrate 10 is equal to the area of the pattern enclosed by the peripheral boundary of the first touch sub-electrodes 131, the arrangement of the present disclosure may effectively reduce the capacitance between the common electrode 11 and the touch driving electrode, to solve the problem that it is difficult to drive the touch driving electrode due to excessive capacitance at the touch detection stage.

Optionally, as shown in FIG. 14, the touch driving electrode is disposed on the same layer with the common electrode 11.

In the arrangement of the present disclosure, on the basis that the front projections of the first touch sub-electrodes 131 on the substrate 10 do not overlap with the front projections of the common electrode 11 and the second touch sub-electrodes 132 on the substrate 10, and the front projection of the common electrode 11 on the substrate 10 and the front projection of the touch sensing electrode on the substrate 10 have overlapping areas, the touch driving electrode and the common electrode 11 may be arranged on the same layer. In the event that the materials of the touch driving electrode and the common electrode 11 are the same, the touch driving electrode and the common electrode 11 are formed through one-time patterning process, a layer of mask may be reduced, and preparation cost of the touch substrate can be saved.

Figure 15:
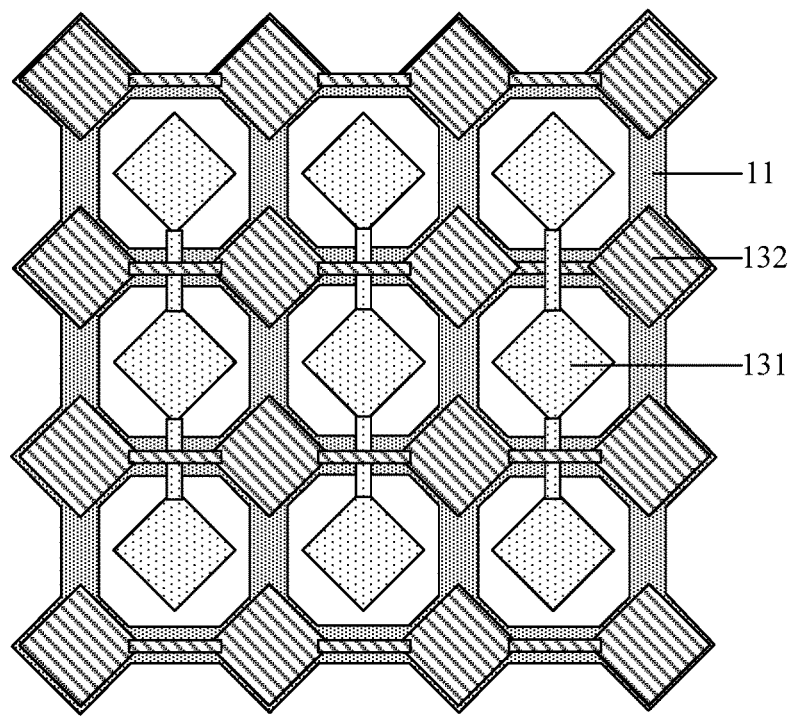
FIG. 15 is a schematic top view of a touch substrate provided by an arrangement of the present disclosure.

Optionally, as shown in FIG. 15, the front projection of the common electrode 11 on the substrate 10 completely covers the front projection of the touch sensing electrode on the substrate 10.

In the arrangement of the present disclosure, as compared with the related art, the overlapping area of the front projections of the common electrode 11 and the touch driving electrode on the substrate 10 in the arrangement of the present disclosure is reduced, so that the front projection of the common electrode 11 on the substrate 10 and the front projection of the touch sensing electrode on the substrate 10 should be at least ensured to have overlapping areas to realize the pressure detection. Preferably, the front projection of the common electrode 11 on the substrate 10 completely covers the front projection of the touch sensing electrode on the substrate 10 to avoid affecting the pressure detection effect.

Figure 16:
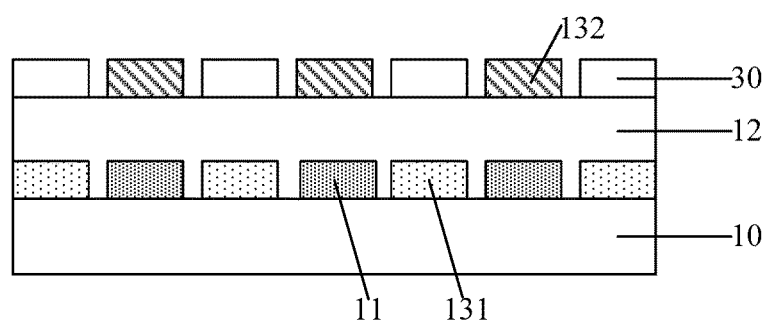
FIG. 16 is a schematic structural view of a touch substrate provided by an arrangement of the present disclosure.

Optionally, as shown in FIG. 16, the touch substrate further includes a plurality of auxiliary electrodes 30 that are arranged on the same layer with the touch sensing electrodes and are insulated from one another, and the adjacent auxiliary electrodes 30 are electrically connected through the first bridge 21. The auxiliary electrodes 30 correspond to the first touch sub-electrodes 131 one by one, and the front projection of each auxiliary electrode 30 on the substrate 10 completely covers the front projection of the corresponding first touch sub-electrode 131 on the substrate 10.

It should be noted that, firstly, a plurality of first bridges 21 may be spaced apart from the touch sensing electrode by the insulating blocks 24.

Secondly, the front projections of the auxiliary electrodes 30 on the substrate 10 just cover the front projections of the corresponding first touch sub-electrodes 131 on the substrate 10, and the area of the front projections of the auxiliary electrode 30 on the substrate 10 is equal to the area of the front projections of the corresponding first touch sub-electrodes 131 on the substrate 10. The front projections of the auxiliary electrode 30 on the substrate 10 may completely cover the front projections of the corresponding first touch sub-electrodes 131 on the substrate 10, and the area of the front projections of the auxiliary electrode 30 on the substrate 10 is larger than the area of the front projections of the corresponding first touch sub-electrodes 131 on the substrate 10.

In the arrangement of the present disclosure, at the testing stage, the piezoelectric material layer 12 is polarized by corresponding the touch driving electrode to the auxiliary electrode 30 up and down and corresponding the touch sensing electrode to the common electrode 11 up and down, so that molecules in the piezoelectric material layer 12 realize regular ionization arrangement, and the piezoelectric material layer 12 after being polarized has a pressure sensing function. At the pressure detection stage, even if the potential of the auxiliary electrode 30 is a floating potential, a portion of the piezoelectric material layer 12 corresponding to the touch driving electrode has a piezoelectric function.

Figure 17:
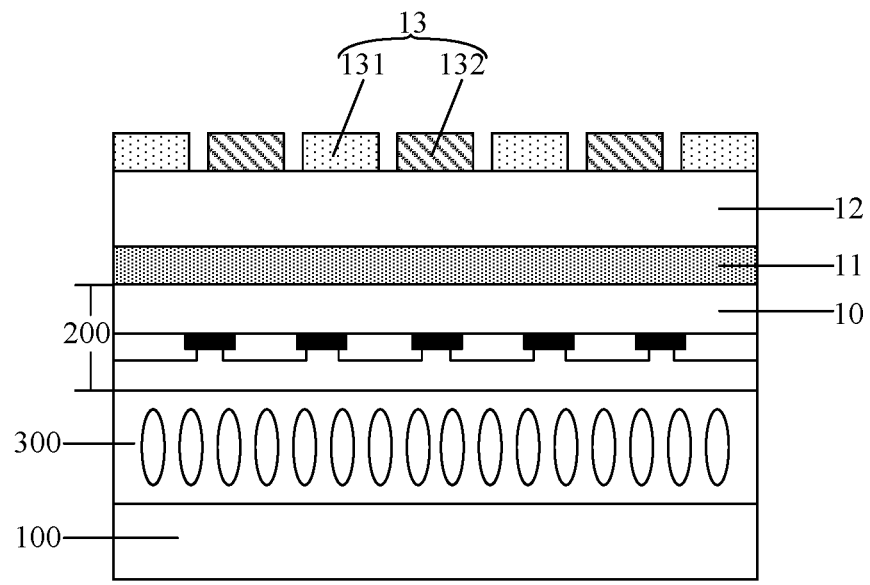
FIG. 17 is a schematic structural view of a display device provided by an arrangement of the present disclosure.
Figure 18:
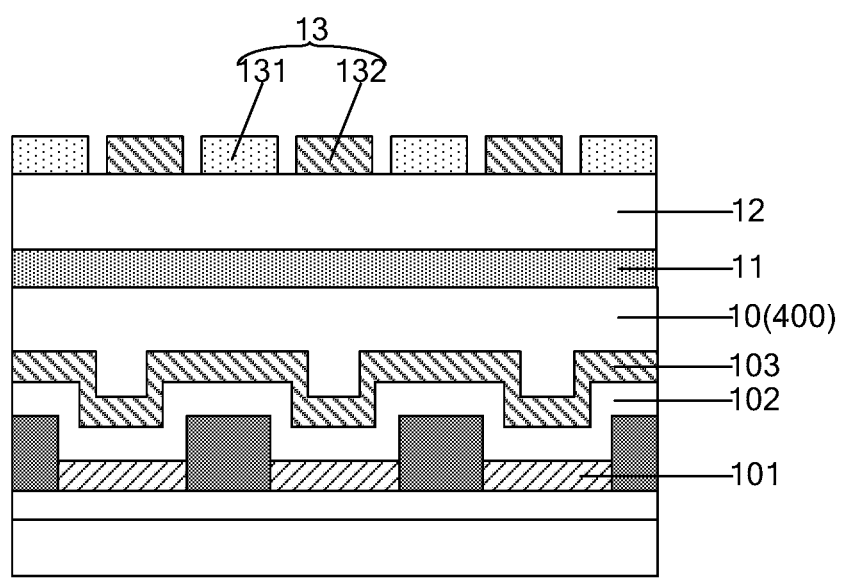
FIG. 18 is a schematic structural view of a display device provided by an arrangement of the present disclosure.
Figure 19:
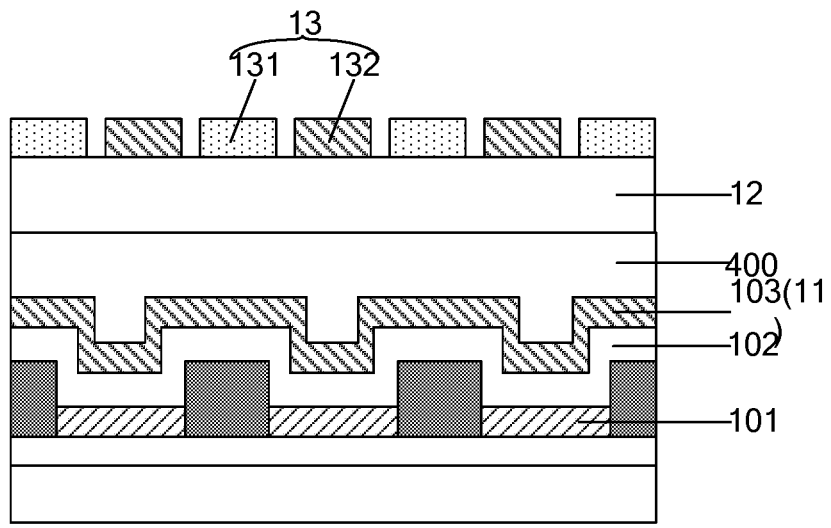
FIG. 19 is a schematic structural view of a display device provided by an arrangement of the present disclosure.

An arrangement of the present disclosure provides a display device, as shown in FIGS. 17-19, including a display panel and a touch substrate according to any of the preceding arrangements. The touch substrate is disposed on a light-emitting side of the display panel.

Here, the display device may be a display panel or a display including the display panel.

It should be noted that, firstly, the display device includes a display area and a non-display area positioned at a periphery of the display area. The touch substrate may be disposed in the display area of the display device and also in the non-display area of the display device.

Here, the touch substrate is disposed in the display area of the display device, which may avoid increasing frame width of the display device due to the touch substrate being disposed in the non-display area, and is beneficial for a narrow frame design of the display device.

Secondly, the display device may be a liquid crystal display and also an electroluminescent display device. The electroluminescent display device may be an organic electroluminescent display (OLED), or the electroluminescent display device may be an inorganic electroluminescent diode display.

As shown in FIG. 17, the liquid crystal display includes an array substrate 100, an opposite substrate 200, and a liquid crystal layer 300 between the array substrate 100 and the opposite substrate 200. The array substrate 100 includes a thin-film transistor and a pixel electrode electrically connected with a drain electrode of the thin-film transistor. The liquid crystal display further includes a common electrode layer, a color light-filtering layer and a black matrix. The common electrode layer, the color light-filtering layer and the black matrix may be arranged on the array substrate 100 and also on the opposite substrate 200.

As shown in FIG. 18, the electroluminescent display device includes an array substrate and a packaging layer 400. The array substrate includes a thin-film transistor and an electroluminescent device. The electroluminescent device includes an anode layer 101, a light-emitting functional layer 102, and a cathode layer 103 sequentially laminated on the substrate 10, in which the anode layer 101 and the piezoelectric material layer 12 are positioned on opposite sides of the substrate 10.

Thirdly, when the display device is a liquid crystal display, the touch substrate is disposed on the light-emitting side of the liquid crystal display. For example, as shown in FIG. 17, the substrate 10 of the touch substrate is also used as the substrate 10 of the opposite substrate 200 of the liquid crystal display; and the common electrode 11, the piezoelectric material layer 12, and the touch electrode 13 are sequentially arranged on one side of the opposite substrate 200 facing away from the array substrate 100.

When the display device is an electroluminescent display device, the touch substrate is disposed on the light-emitting side of the electroluminescent display device. As shown in FIG. 18, the substrate 10 of the touch substrate is also used as the packaging layer 400 of the electroluminescent display device; and the common electrode 11, the piezoelectric material layer 12, and the touch electrode 13 are sequentially laminated on one side of the packaging layer 400 facing away from the array substrate. Alternatively, as shown in FIG. 19, the common electrode 11 of the touch substrate is also used as the cathode layer 103 of the electroluminescent display device, to reduce thickness of the electroluminescent display device and facilitate for a thin design of the electroluminescent display device.

An arrangement of the present disclosure provides a display device, which has the same technical effect as the aforementioned touch substrate, and will not be described any more.

An arrangement of the present disclosure provides a detection method of the touch substrate according to any one of the preceding arrangements. The detection method includes: detecting a touch position by using the touch electrode 13 at a touch detection stage, inputting a fixed potential to the common electrode 11 at the pressure detection stage, and under the action of pressure, detecting magnitude of the pressure by detecting amount of the charges received by the touch electrode 13.

Here, at the pressure detection stage, the piezoelectric material layer 12 generates electric charges under the action of pressure; the touch electrode 13 receives the electric charges in a charge-coupling manner; and an external circuit electrically connected with the touch electrode 13 detects the magnitude of the pressure according to the amount of electric charges received by the touch electrode 13.

An arrangement of the present disclosure provides a detection method of a touch substrate, which has the same technical effect as the aforesaid touch substrate, and thus being not repeated any more.

Optionally, in the event that the touch substrate includes a plurality of auxiliary electrodes 30, the method further includes: at the testing stage, the potential of the auxiliary electrodes 30 is the same as the potential of the common electrode 11; at the touch detection stage and at the pressure detection stage, the potential of the auxiliary electrode 30 is a floating potential.

The testing stage may be a stage before mass production of the touch substrate. After mass production, the potential of the auxiliary electrode 30 is always the floating potential, to avoid generating capacitance between the auxiliary electrode 30 and the touch electrode 13 at the touch detection stage or the pressure detection stage after the mass production.

In the arrangement of the present disclosure, at a testing stage, the piezoelectric material layer 12 is polarized by corresponding the touch electrode 13 to the auxiliary electrode 30 and the common electrode 11 up and down, so that molecules in the piezoelectric material layer 12 realize regular ionization arrangement, and the piezoelectric material layer 12 after being polarized has a pressure sensing function. At the pressure detection stage, even if a potential of the auxiliary electrode 30 is a floating potential, the entire piezoelectric material layer 12 may have a piezoelectric function.

An arrangement of the present disclosure further provides a touch substrate, as shown in FIGS. 20-25, including a common electrode 11, a piezoelectric material layer 12 and a touch electrode 13, which are sequentially laminated on the substrate 10; and further including an insulating layer 14, which is arranged between the common electrode 11 and the touch electrode 13.

It should be noted, firstly, materials of the insulating layer 14 are not limited. For example, the material of the insulating layer 14 may be resin, silicon nitride, silicon oxide, or the like.

Figure 20:
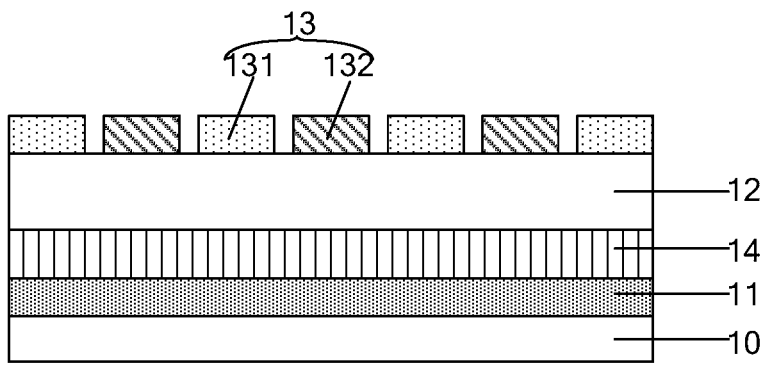
FIG. 20 is a schematic structural view of a touch substrate provided by an arrangement of the present disclosure.
Figure 21:
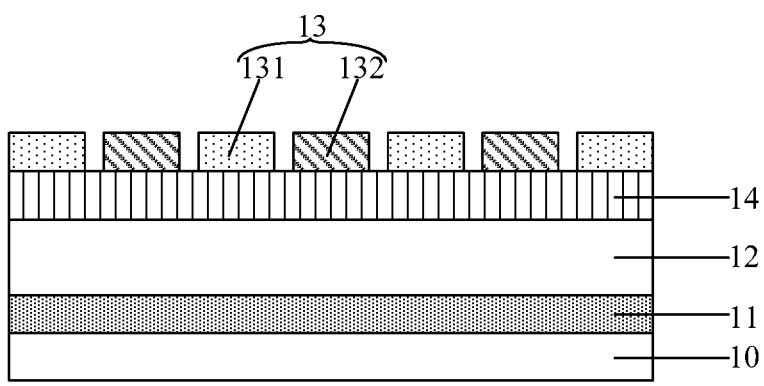
FIG. 21 is a schematic structural view of a touch substrate provided by an arrangement of the present disclosure.
Figure 22:
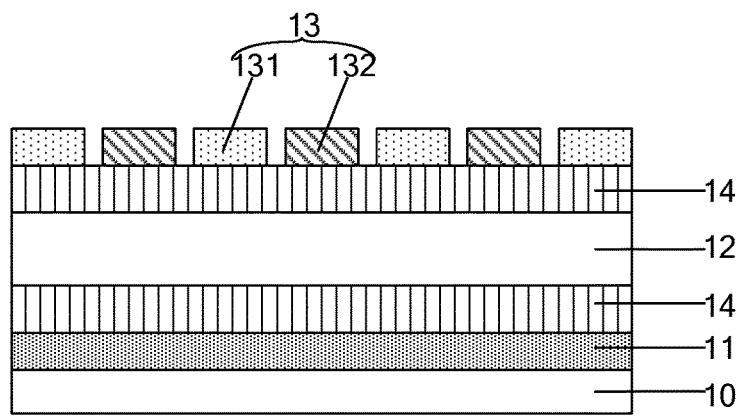
FIG. 22 is a schematic structural view of a touch substrate provided by an arrangement of the present disclosure.
Figure 24:
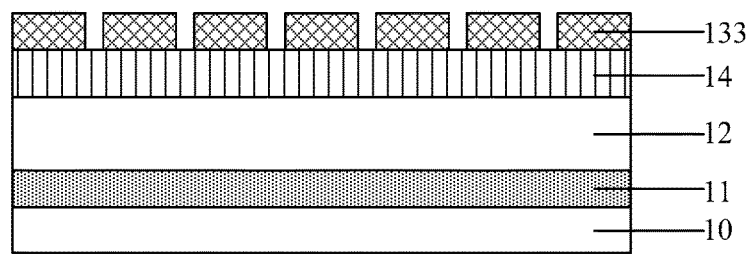
FIG. 24 is a schematic structural view of a touch substrate provided by an arrangement of the present disclosure.
Figure 25:
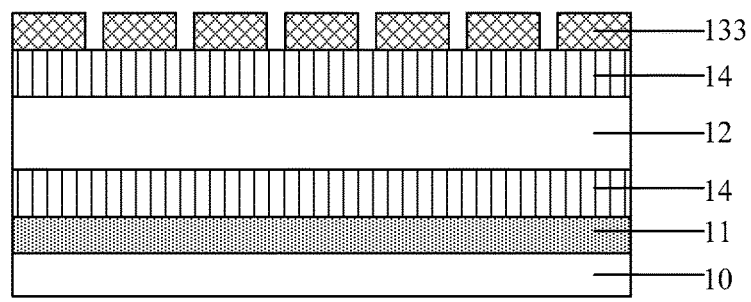
FIG. 25 is a schematic structural view of a touch substrate provided by an arrangement of the present disclosure.

Secondly, as shown in FIGS. 20-22, the touch electrode 13 includes a plurality of touch driving electrodes and a plurality of touch sensing electrodes. The touch driving electrodes and the touch sensing electrodes cross with each other and are insulated from one another. The touch driving electrodes include a plurality of first touch sub-electrodes 131 that are electrically connected. The touch sensing electrodes include a plurality of second touch sub-electrodes 132 that are electrically connected. Alternatively, as shown in FIGS. 23-25, the touch electrode 13 includes a plurality of third touch sub-electrodes 133.

Figure 23:
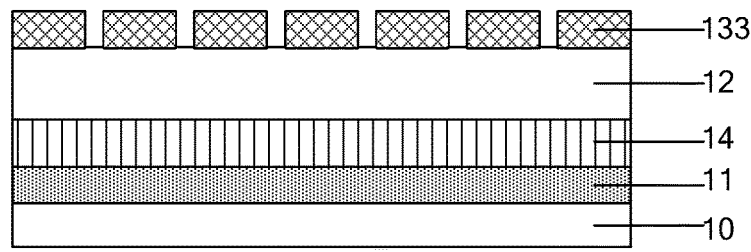
FIG. 23 is a schematic structural view of a touch substrate provided by an arrangement of the present disclosure.

Thirdly, as shown in FIGS. 20 and 23, the insulating layer 14 is disposed on one side of the piezoelectric material layer 12 close to the common electrode 11. As shown in FIGS. 21 and 24, the insulating layer 14 is disposed on one side of the piezoelectric material layer 12 close to the touch electrode 13. As shown in FIGS. 22 and 25, the insulating layer 14 is disposed on one side of the piezoelectric material layer 12 close to the common electrode 11 and on one side of the piezoelectric material layer 12 close to the touch electrode 13.

An arrangement of the present disclosure provides a touch substrate, in which a distance between the touch driving electrode and the common electrode 11 is increased to reduce the capacitance between the touch driving electrode and the common electrode 11, so as to solve the problem that it is difficult to drive the touch electrode due to excessive capacitance at the touch detection stage.

An arrangement of the present disclosure provides a touch substrate, as shown in FIGS. 26-31, including a piezoelectric material layer 12, a touch driving electrode and a touch sensing electrode, which are arranged on a substrate 10. The touch driving electrode and the touch sensing electrode are respectively arranged on one side of the piezoelectric material layer 12 close to or away from the substrate 10. The touch substrate further includes an insulating layer 14 arranged between the touch driving electrode and the touch sensing electrode. The touch driving electrode includes a plurality of first touch sub-electrodes 131 that are electrically connected. The touch sensing electrode includes a plurality of second touch sub-electrodes 132 that are electrically connected.

Figure 26:
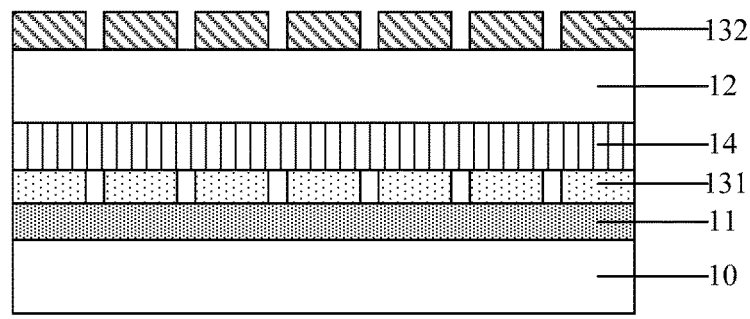
FIG. 26 is a schematic structural view of a touch substrate provided by an arrangement of the present disclosure.
Figure 27:
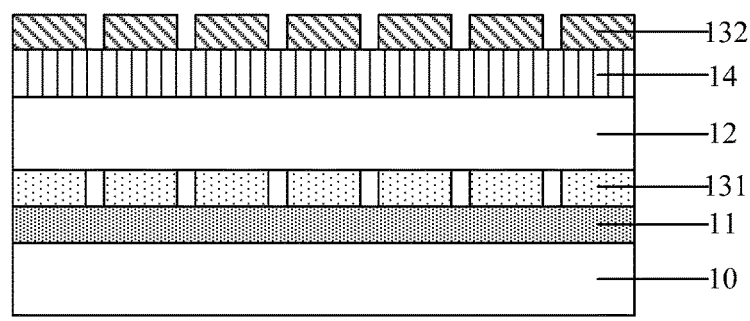
FIG. 27 is a schematic structural view of a touch substrate provided by an arrangement of the present disclosure.
Figure 28:
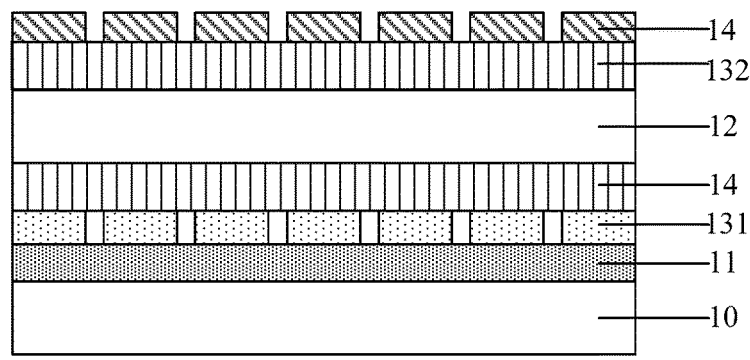
FIG. 28 is a schematic structural view of a touch substrate provided by an arrangement of the present disclosure.
Figure 29:
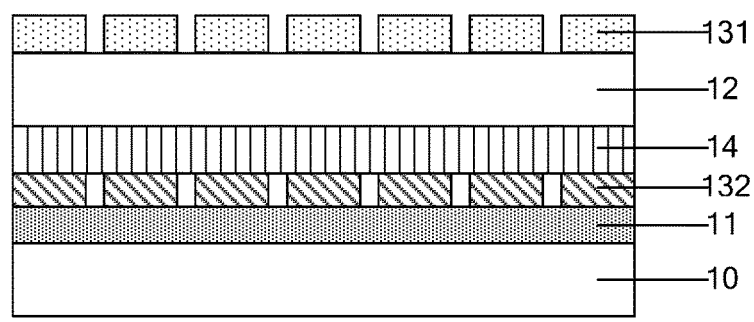
FIG. 29 is a schematic structural view of a touch substrate provided by an arrangement of the present disclosure.

It should be noted that, firstly, as shown in FIGS. 26-28, the touch driving electrode is disposed on one side of the piezoelectric material layer 12 close to the substrate 10, and the touch sensing electrode is disposed on one side of the piezoelectric material layer 12 facing away from the substrate 10. Alternatively, as shown in FIGS. 29-31, the touch driving electrode is disposed on one side of the piezoelectric material layer 12 facing away from the substrate 10, and the touch sensing electrode is disposed on one side of the piezoelectric material layer 12 close to the substrate 10.

Figure 30:
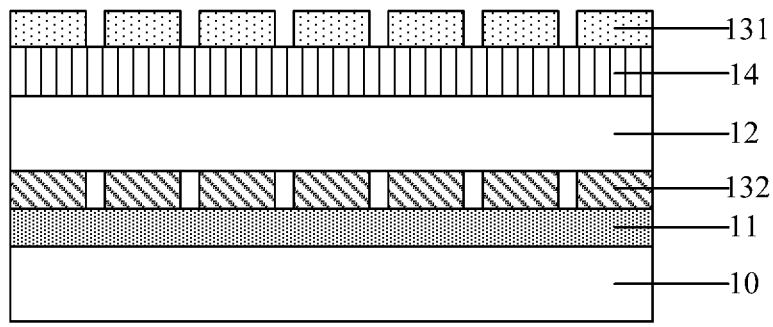
FIG. 30 is a schematic structural view of a touch substrate provided by an arrangement of the present disclosure.

Secondly, as shown in FIGS. 26 and 30, the insulating layer 14 is disposed on one side of the piezoelectric material layer 12 close to the touch driving electrode. As shown in FIGS. 27 and 29, the insulating layer 14 is disposed on one side of the piezoelectric material layer 12 close to the touch sensing electrode. As shown in FIGS. 28 and 31, the insulating layer 14 is disposed on one side of the piezoelectric material layer 12 close to the touch sensing electrode and on one side of the piezoelectric material layer 12 close to the touch driving electrode.

An arrangement of the present disclosure provides a touch substrate, in which a distance between the touch driving electrode and the touch sensing electrode is increased to reduce the capacitance between the touch driving electrode and the touch sensing electrode, so as to solve the problem that it is difficult to drive the touch driving electrode due to excessive capacitance at the touch detection stage.

Figure 31:
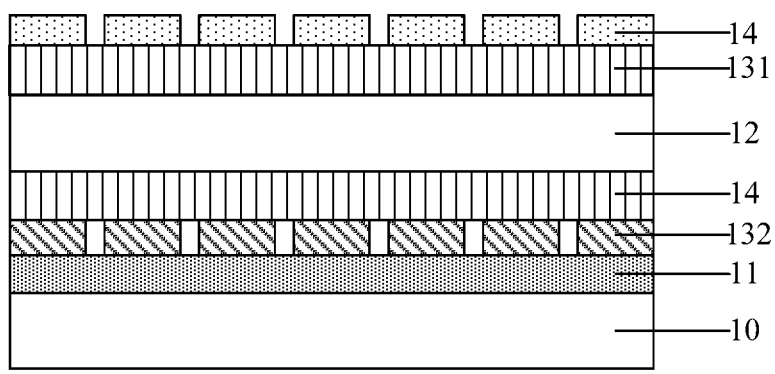
FIG. 31 is a schematic structural view of a touch substrate provided by an arrangement of the present disclosure.
Figure 32:
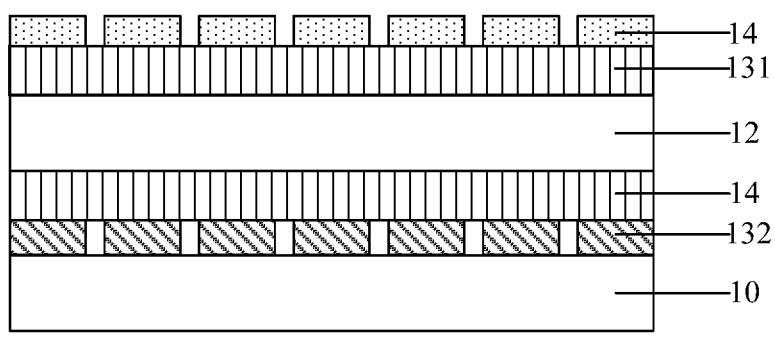
FIG. 32 is a schematic structural view of a touch substrate provided by an arrangement of the present disclosure.

Optionally, a common electrode 11 is further included, as shown in FIGS. 26-31, the common electrode 11 is disposed on one side of the touch driving electrode facing away from the touch sensing electrode. On the basis of this, when the touch substrate is applied to an electroluminescent display device, the common electrode 11 may also be used as the cathode layer 103 in the electroluminescent display device to reduce the thickness of the electroluminescent display device. Alternatively, as shown in FIG. 31, the touch driving electrodes are also used as the common electrode 11. On the basis of this, when the touch substrate is applied to an electroluminescent display device, the common electrode 11 and the touch driving electrodes may also be used as the cathode layer 103 in the electroluminescent display device to reduce the thickness of the electroluminescent display device.

Here, when the touch driving electrodes are also used as the common electrode 11, the common electrode 11 is strip-shaped or block-shaped.

The present disclosure is described merely through aforesaid specific implementations, but the protection scope of the present disclosure is not limited thereto. Any person skilled in the art may easily think of variations or substitutions within the technical scope as disclosed in the present disclosure, which all should be contained within the scope of the disclosure. Therefore, the protection scope of the present disclosure should be determined depending on the protection scope of the claims.

What is claimed is:

1. A touch substrate, comprising a common electrode, a piezoelectric material layer and a touch electrode sequentially disposed on a substrate,
    wherein the touch electrode comprises a plurality of touch driving electrodes and a plurality of touch sensing electrodes; the touch driving electrodes and the touch sensing electrodes cross with each other and are insulated from one another; the touch driving electrodes comprise a plurality of first touch sub-electrodes electrically connected to one another; and an overlapping area of front projections of the common electrode and each of the first touch sub-electrodes on the substrate is smaller than an area of a pattern enclosed by a peripheral boundary of each of the first touch sub-electrodes,
    a plurality of auxiliary electrodes arranged on a same layer with the common electrode and insulated from one another, and adjacent ones of the auxiliary electrodes are electrically connected through a first bridge; and
    the auxiliary electrodes correspond to the first touch sub-electrodes one by one, and front projections of the auxiliary electrodes on the substrate completely cover front projections of corresponding first touch sub-electrodes on the substrate.

2. The touch substrate according to claim 1, wherein the common electrode is presented in a grid shape;
    the overlapping area of the front projections of the common electrode and each of the first touch sub-electrodes on the substrate is 0.

3. The touch substrate according to claim 2, wherein the first touch sub-electrodes are presented in a grid shape.

4. The touch substrate according to claim 1, wherein a front projection of the common electrode on the substrate completely covers a front projection of the touch sensing electrode on the substrate.

5. The touch substrate according to claim 1, wherein the first touch sub-electrodes are presented in a grid shape, and the common electrode is presented in a plate shape tiled on the substrate.

6. The touch substrate of claim 1, wherein the touch sensing electrode comprises a plurality of second touch sub-electrodes electrically connected to one another;

adjacent ones of the second touch sub-electrodes in the touch sensing electrodes are electrically connected to each other, and adjacent one of the first touch sub-electrodes in the touch driving electrodes are electrically connected to each other by a second bridge;

or, the adjacent first touch sub-electrodes in the touch driving electrode are electrically connected to each other, and the adjacent second touch sub-electrodes in the touch sensing electrode are electrically connected to each other by a third bridge.

7. A display device comprising a display panel, further comprising the touch substrate of claim 1;

the touch substrate is arranged on a light-emitting side of the display panel.

8. The display device according to claim 7, wherein the display panel is an electroluminescent display panel, and comprises an anode layer, a light-emitting functional layer, and a cathode layer sequentially disposed on a side of the touch substrate, the cathode layer is also used as the common electrode.

9. A detection method of the touch substrate according to claim 1, comprising:

at a touch detection stage, detecting a touch position using a touch electrode;

at a pressure detection stage, inputting a fixed potential to a common electrode, under an action of pressure, detecting magnitude of a pressure by detecting amount of charges received by the touch electrode.

10. The detection method of the touch substrate according to claim 9, wherein the touch substrate comprises a plurality of auxiliary electrodes, the method further comprises:

at a testing stage, a potential of the auxiliary electrode is the same as the potential of the common electrode;

at the touch detection stage and at the pressure detection stage, the potential of the auxiliary electrode is a floating potential.

11. A touch substrate, comprising a common electrode, a piezoelectric material layer and a touch electrode sequentially disposed on a substrate;

the touch electrode comprises a plurality of touch sub-electrodes, and an overlapping area of a front projection of the common electrode and each of the touch sub-electrodes on the substrate is smaller than an area of a pattern enclosed by a peripheral boundary of each of the touch sub-electrodes, the touch substrate further comprises a plurality of auxiliary electrodes that are disposed on a same layer with the common electrode and are insulated from one another, and adjacent ones of the auxiliary electrodes are electrically connected to one another through a first bridge;

the auxiliary electrodes correspond to the touch sub-electrodes one by one, and front projections of the auxiliary electrodes on the substrate cover front projections of corresponding touch sub-electrodes on the substrate.

12. The pressure touch display according to claim 11, wherein the overlapping area of the front projections of the common electrode and each of the touch sub-electrodes on the substrate is 0;

the common electrode is presented in a grid shape; or, the touch sub-electrodes are presented in a grid shape.

13. The touch substrate according to claim 11, wherein the common electrode is presented in a grid shape.

14. A touch substrate, comprising a common electrode, a piezoelectric material layer and a plurality of touch sensing electrodes disposed on a substrate, and further comprising a plurality of touch driving electrodes disposed on a side of the piezoelectric material layer facing away from the touch sensing electrodes, the touch driving electrodes and the common electrode being insulated from each other, wherein projections of the touch sensing electrodes and the common electrode on the substrate have an overlapping area;

the touch driving electrode comprises a plurality of first touch sub-electrodes electrically connected to one another, the touch sensing electrode comprises a plurality of second touch sub-electrodes electrically connected to one another, and front projections of the first touch sub-electrodes on the substrate do not overlap with front projections of the second touch sub-electrodes and the common electrode on the substrate.

15. The touch substrate according to claim 14, wherein the touch driving electrode and the common electrode are disposed on a same layer.

16. The touch substrate according to claim 14, wherein the common electrode is presented in a grid shape.

17. The touch substrate of claim 14, wherein front projection of the common electrode on the substrate completely covers front projection of the touch sensing electrode on the substrate.

18. The touch substrate according to claim 14, further comprising a plurality of auxiliary electrodes that are disposed on a same layer with the touch sensing electrodes and are insulated from one another, and adjacent ones of the auxiliary electrodes are electrically connected to one another through a first bridge;

the auxiliary electrodes correspond to the first touch sub-electrodes one by one, and a front projection of the auxiliary electrode on the substrate completely cover a front projection of a corresponding one of the first touch sub-electrodes on the substrate.

* * * * *